United States Patent Office 2,885,247
Patented May 5, 1959

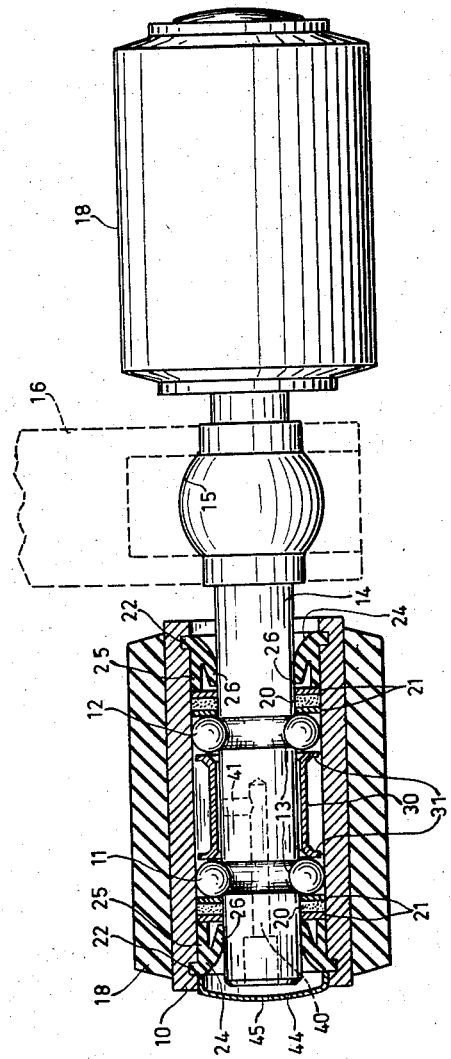

2,885,247

ANTI-FRICTION TOP ROLL

Otto W. Schlums, Whitinsville, Mass., assignor to Whitin Machine Works, Whitinsville, Mass., a corporation of Massachusetts Application May 24, 1957, Serial No. 661,515

1 Claim. (Cl. 308—187)

This invention relates to top rolls adapted for use in textile drawing frames and in other similar textile machines. Such rolls are commonly superposed on rotated lower rolls, and are themselves rotated by surface-engagement therewith.

In the construction herein shown, the rolls are mounted in pairs on non-rotating arbors and are each supported on axially-spaced ball or roller bearings. Substantial pressure is applied to the rolls through the non-rotating arbor, and effective lubrication of the top roll bearings is required.

It is the general object of my present invention to make provision for improved and effective lubrication of each pair of spaced bearings, while at the same time using a substantially reduced amount of lubricant. I also avoid supplying lubrication in relatively large amounts to the inert space between the separated bearings. By substantially reducing the amount of lubricant supplied to the bearings, I correspondingly reduce the expense and also the probability of leakage.

My invention further relates to certain arrangements and combinations of parts which will be hereinafter described and more particularly pointed out in the appended claims.

A preferred form of the invention is shown in the drawing, which is a front elevation, partly in section, of a top roll embodying my improvements.

In the drawing, I have shown a top roll unit comprising a pair of top rolls, and with each top roll comprising a roll member or sleeve 10 of constant internal diameter as illustrated, mounted on balls 11 and 12, which balls are seated in annular grooves 13 in an arbor 14. The arbor 14 has a spherical enlargement 15 seated in a slotted pressure-applying support 16 which forms no part of the present invention.

Each roll has a cot or outer shell 18 secured to the member 10. Felt washers 20 are mounted between steel washers 21, with the inner steel washer of each pair directly engaging the balls 11 or 12.

Each roll member or sleeve 10 has internal annular grooves 22 near its opposite ends, which receive outer flanges of sealing rings 24.

Each sealing ring 24 is formed at its inner end with an outer portion 25 abutting the outer steel washer 21 and with an inner portion 26 engaging the arbor 14.

In order to reduce the lubricant storage space between the ball units 11 and 12, I provide a lubricant deflector or sleeve 30 formed of nylon or some equivalent and relatively stiff or rigid material and of such diameter that it will slightly clear the surface of the arbor 14. I also provide end flanges 31 for the sleeve or deflector 30, and these flanges are spaced apart to closely engage the balls 11 and 12. The outer edges or peripheries of the flanges 31 also closely engage the inner surface of the roll member 10.

An oil hole 40 extends inward from the end of the arbor 14 and connects with a cross hole or passage 41 through which lubricant can be forced into and through the clearance space between the arbor 14 and the sleeve 30 and into the sets of balls 11 and 12, the sleeve being in effect floatingly mounted.

Any suitable provision may be made for attaching a grease gun or similar device to the end of the arbor 14, so that a measured amount of lubricant can be forced into the two spaced bearings. A removable cap 45 is seated in the end of the member 10.

With this construction, lubricant is supplied in the desired amount to each set of balls 11 and 12, and the lubricant also fills the restricted passage between the arbor 14 and the sleeve 30, but the end flanges 31 of the sleeve 30 very effectively exclude lubricant from the annular space between the sleeve 30 and the roll number 10.

In a frame having a large number of spindles, the amount of lubricant used in starting up a machine is thus very substantially reduced.

Having thus described my invention and the advantages thereof, I do not wish to be limited to the details herein disclosed, otherwise than as set forth in the claim, but what I claim is:

An anti-friction top roll bearing comprising a non-rotated arbor, anti-friction bearing units comprising annular grooves in the arbor and balls in the grooves in spaced and predetermined axial relation on said arbor, a roll member of constant internal diameter supported by and rotatable on said spaced bearing balls, an imperforate sleeve concentrically encompassing the arbor between the spaced bearing units, the bore of the sleeve having a diameter only slightly greater than the non-rotated arbor to provide a loose mounting of the sleeve and a restricted annular lubricant passage between said sleeve and arbor, and said sleeve being slightly shorter than the predetermined space between said bearing units and having an outwardly directed annular flange at each end closely adjacent the bearing balls and engaged at their outer edges with the inner surface of the roll member and said arbor having a grease passage therein opening into the space between the sleeve and the arbor.

References Cited in the file of this patent

UNITED STATES PATENTS

| | | |
|---|---|---|
| 1,347,519 | Place | July 27, 1920 |
| 1,373,675 | Rouanet | Apr. 5, 1921 |
| 2,286,422 | Katcher | June 16, 1942 |
| 2,724,623 | Robinson et al. | Nov. 22, 1955 |
| 2,727,280 | Waite | Dec. 20, 1955 |